United States Patent [19]

Park

[11] Patent Number: 5,644,198

[45] Date of Patent: Jul. 1, 1997

[54] FLYBACK TRANSFORMER DRIVING APPARATUS FOR VIDEO DISPLAY APPLIANCES

[75] Inventor: Kwang Ho Park, Kyoungsangbuk-do, Rep. of Korea

[73] Assignee: LG Electronics Inc., Seoul, Rep. of Korea

[21] Appl. No.: 700,591

[22] Filed: Aug. 14, 1996

[30] Foreign Application Priority Data

Aug. 28, 1995 [KR] Rep. of Korea .............. 95-26886

[51] Int. Cl.$^6$ .................................................. H01J 29/70
[52] U.S. Cl. .................. 315/411; 363/20; 363/21
[58] Field of Search ........................... 315/411; 348/730; 363/20, 21, 41

[56] References Cited

U.S. PATENT DOCUMENTS

| 4,890,210 | 12/1989 | Myers | 363/21 |
| 5,285,368 | 2/1994 | Ishikawa | 363/21 |
| 5,453,921 | 9/1995 | Shutts | 363/21 |

FOREIGN PATENT DOCUMENTS

| 0576149A2 | 12/1993 | European Pat. Off. |
| 2141564 | 12/1984 | United Kingdom . |

OTHER PUBLICATIONS

Search Report: 20 Dec. 1996.

*Primary Examiner*—Theodore M. Blum
*Attorney, Agent, or Firm*—Christie, Parker & Hale, LLP

[57] ABSTRACT

A flyback transformer (FBT) driving apparatus for video display appliances which can prevent deterioration of the FBT efficiency caused by excessive horizontal frequency input. The FBT driving apparatus employs a PWM-type circuit to evenly maintain the Vcc power supply provided to the primary winding of the FBT irrespective of the excessive horizontal frequency input. The FBT driving apparatus makes use of the horizontal frequency per se in the low frequency band, while dividing the horizontal frequency by a half in the high frequency band to enable operation of the FBT by means of ordinary rectifying diodes even in the input of the high horizontal frequency and to prevent deterioration of the FBT efficiency caused by input of the high horizontal frequency.

6 Claims, 4 Drawing Sheets

FIG. 3A  fh  
FIG. 3B  a  
FIG. 3C  c  
FIG. 3D  d  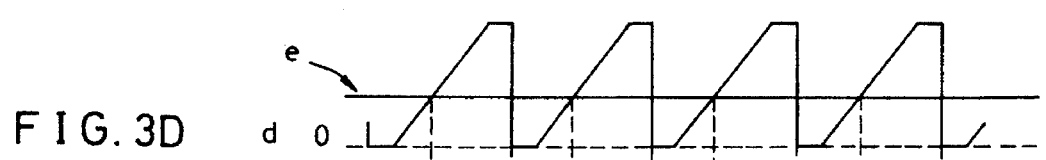
FIG. 3E  f  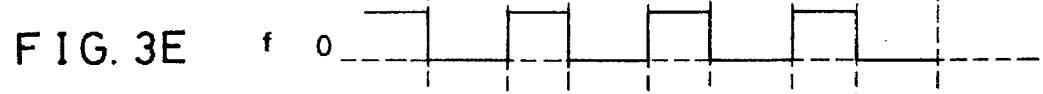
FIG. 3F  g  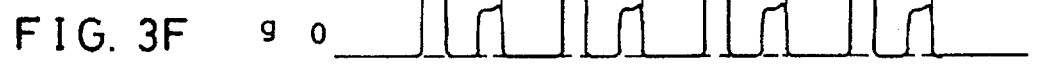

FIG. 4A  fh
FIG. 4B  a
FIG. 4C  c
FIG. 4D  d
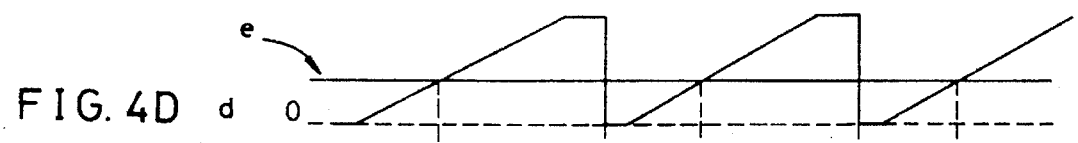
FIG. 4E  f
FIG. 4F  g

FLYBACK TRANSFORMER DRIVING APPARATUS FOR VIDEO DISPLAY APPLIANCES

BACKGROUND OF THE INVENTION

1. Field of the Invention

The present invention relates to an apparatus for driving a flyback transformer (FBT) which supplies high voltage to a cathode-ray tube (CRT) in a video display appliance, particularly to an apparatus for driving an FBT which can prevent deterioration of the FBT efficiency caused by excessive horizontal frequency input.

2. Description of the Prior Art

FBT driving apparatus is generally used to generate high voltage for driving a CRT-equipped video display appliance. As illustrated in FIG. 1, a conventional FBT driving apparatus comprises a pulse width modulation (PWM) transforming section 21 for comparing an input horizontal sync signal fh with a feedback signal to output a circular wave pulse, a field effect transistor FET21 for receiving the output circular wave pulse from the PWM transforming section 21 to switch and provide a Vcc power supply, a high voltage driving section 22 for driving a switching transistor Q21 by synchronizing it with the input horizontal sync signal fh, a flyback transformer FBT21 for generating high voltage towards a secondary winding by forming a resonance circuit with a diode D22, capacitor C22 and an interposed primary winding coil L22, and a high voltage detecting section 23 for detecting the high voltage generated in the FBT21 and feeding back the detected high voltage to the PWM transforming section 21.

Here, R21, R22 refer to resistors; D21, D23, D24, D25, D26 refer to diodes; L21, L23, L24, L25, L26 refer to coils; and C21, C23 refer to capacitors.

The operation of the conventional FBT driving apparatus for video display appliances constructed above will now be explained.

Referring to FIG. 1, the PWM transforming section 21 compares the input horizontal sync signal fh with the input feedback voltage detected by the high voltage detecting section 23 to output a circular wave pulse according to the resultant voltage. The field effect transistor FET21 is driven by the circular wave pulse to switch the Vcc power supply. The switched Vcc power supply voltage is supplied to the primary winding of the FBT21.

The input horizontal sync signal fh is supplied to the high voltage driving section 22. The switching transistor Q21 is driven by the output of the high driving section 22 which has been synchronized with the input horizontal sync signal fh, thereby driving the FBT21.

In other words, the resonance circuit formed by the primary winding coil L22 and the diode D22 as well as the capacitor C22 connected thereto is driven, thereby inducing AC high voltage to the secondary winding. The secondary induced voltage is rectified by the secondary winding coils L23, L24, L25 and the diodes D24, D25, D26. The rectified voltage is then smoothed by the capacitor C23 and supplied to the following circuits which require high voltage.

The high voltage supplied through the above process is level-detected by the high voltage detecting section 23 comprising the resistors R21, R22. The detected voltage is supplied to the PWM transforming section 21 as a feedback signal to control the high voltage supplied from the FBT21.

In the conventional FBT driving apparatus for video display appliances constructed above, the PWM transforming section 21 and high voltage driving section 22 are synchronized with the input horizontal sync signal fh. Thus, the operation of the FBT21 is controlled according to the horizontal frequency input.

If the frequency of the input horizontal sync signal fh elevates, B+ voltage also elevates, thereby resulting in heat loss of the diode D21 and coil L21 that rectify high horizontal frequency. Particularly, the high voltage diodes D23, D24, D25, D26 provided on the secondary winding of the FBT21 should rectify tens of kilo volts. Accordingly, if the horizontal frequency elevates higher than 100 khz, ordinary rectifying diodes cannot be used. Further, the efficiency of the secondary winding coils L23, L24, L25, L26 of the FBT21 drastically decreases, thereby resulting in a considerable amount of electric current leakage.

SUMMARY OF THE INVENTION

To resolve the aforementioned conventional problems, an object of the present invention is to provide an FBT driving apparatus for video display appliances which can prevent deterioration of the FBT efficiency caused by excessive horizontal frequency input and the subsequent heat loss.

To achieve that object, the present invention employs a PWM-type circuit in the apparatus for driving an FBT so that the Vcc power supply for the primary winding of the FBT can be regulated irrespective of the horizontal frequency. Also, the present invention makes use of the horizontal frequency in the low frequency band to drive the FBT, while equally dividing the horizontal frequency into two in the high frequency band to drive the FBT. This not only enables operation of the FBT by ordinary rectifying diodes even under horizontal frequency input of high frequency band but also prevents deterioration of the FBT efficiency caused by the horizontal frequency of high frequency band.

According to the present invention, an FBT driving apparatus for video display appliances is provided in which the apparatus comprises:

horizontal frequency dividing means for dividing a horizontal frequency in a predetermined ratio in response to an input horizontal sync signal;

horizontal frequency selecting means for selecting and supplying either the horizontal frequency or the divided horizontal frequency provided from the horizontal frequency dividing means in response to the horizontal sync signal;

PWM modulating means for PWM-modulating the horizontal frequency selected by and supplied from the horizontal frequency selecting means, and comparing the modulated horizontal frequency with an error detection voltage to output a resultant circular wave pulse signal;

high voltage generating means for being driven by the circular wave pulse signal supplied from the PWM-modulating means to generate a high voltage; and error detecting means for detecting the high voltage supplied from the high voltage generating means, and comparing the detected voltage with the reference voltage to output the resultant voltage as an error detection voltage.

BRIEF DESCRIPTION OF THE DRAWINGS

The characteristics and advantages of the present invention in addition to the aforementioned object will now be more clearly described with reference to the accompanying drawings, in which:

FIGS. 3A to 3F are waveform diagrams illustrating output waveforms appearing at various points of FIG. 2 when a horizontal sync control signal is inputted with a 'high' level.

FIGS. 4A to 4F are waveform diagrams illustrating output Waveforms appearing at various points of FIG. 2 when a horizontal sync control signal is inputted with a 'low' level.

DETAILED DESCRIPTION OF THE PREFERRED EMBODIMENT

Figure 1:
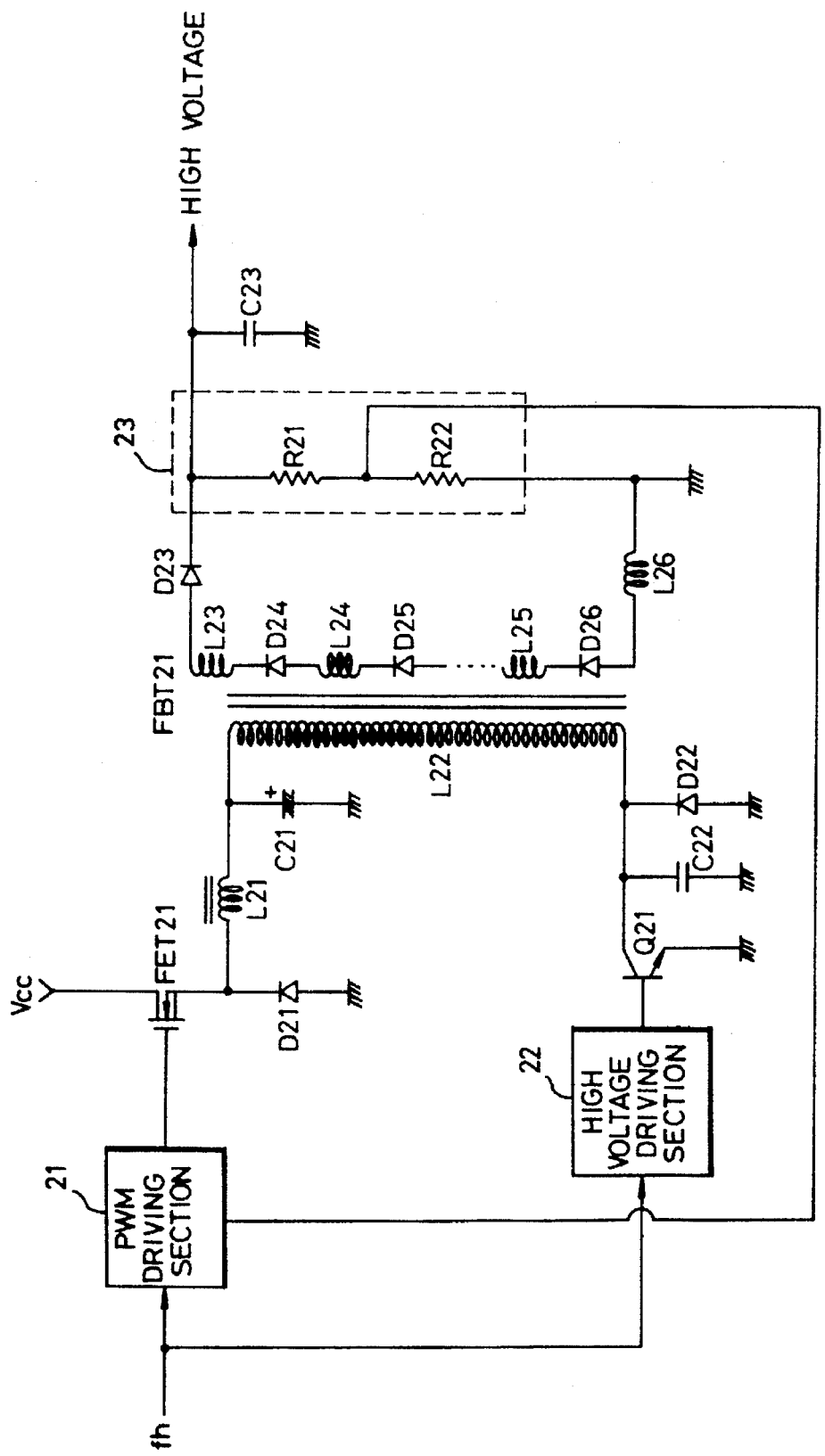
FIG. 1 is a circuit diagram showing construction of the conventional FBT driving apparatus for video display appliances.
Figure 2:
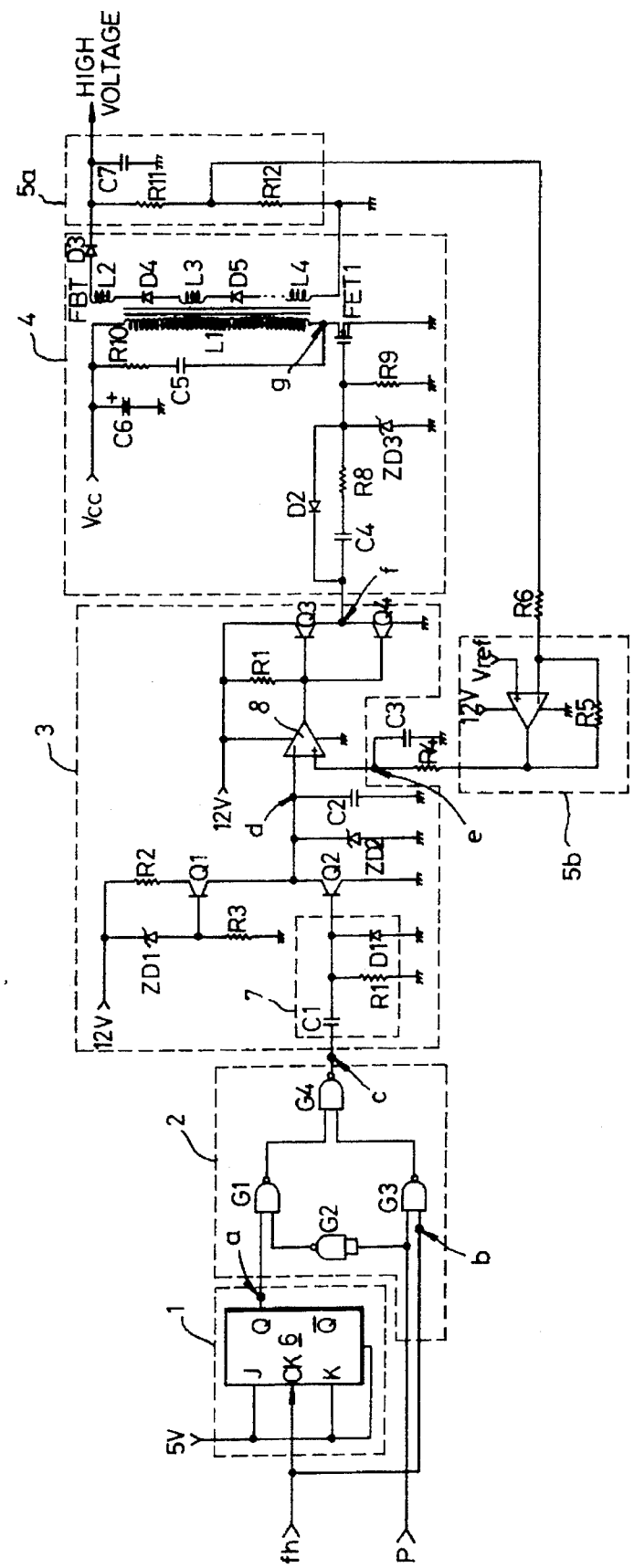
FIG. 2 is a circuit diagram of an FBT driving apparatus for video display appliances according to the present invention.

Referring to FIG. 2, an FBT driving apparatus for video display appliances according to the present invention comprises a horizontal frequency dividing section 1 for dividing the horizontal frequency by a half in response to the input horizontal sync signal fh, a horizontal frequency selecting section 2 for selecting and outputting either the horizontal frequency or the divided horizontal frequency provided from the horizontal frequency dividing section 2 in response to the horizontal sync signal P, a PWM modulating section 3 for modulating the horizontal frequency selected by and supplied from the horizontal frequency selecting section 2 and comparing the modulated horizontal frequency with the error detection voltage to output the resultant circular wave pulse signal, a high voltage generating section 4 for being driven by the circular wave pulse signal to generate a high voltage, and error detecting section 5 for detecting the high voltage supplied from the high voltage generating section 4 and comparing the detected voltage with a reference voltage Vref to output the resultant voltage as an error detection voltage.

The horizontal frequency dividing section 1 comprises a J-K-type flip-flop 6 which divides the horizontal frequency of the horizontal sync signal fh by a half in response to the horizontal sync signal fh.

The horizontal frequency selecting section 2 comprises a plurality of NAND gates G1, G2, G3, G4 for selecting and outputting either the horizontal frequency of the horizontal sync signal fh or the divided horizontal frequency outputted from the J-K-type flip flop 6 in response to a horizontal sync control signal P.

The PWM modulating section 3 includes a differentiation circuit 7 for differentiating the signal supplied from the horizontal frequency selecting section 2, a transistor Q2 switched by the output of the differentiation circuit 7, and a comparator 8 for comparing the output signal from the transistor Q2 with the error detection signal supplied from the error amplifier 5 to output a resultant circular wave pulse signal.

The high voltage generating section 4 includes a field effect transistor FET1, which is driven and controlled by the circular wave pulse signal supplied from the PWM modulating section 3, and a flyback transformer FBT for receiving the driving power supply from the field effect transistor FET1 at its primary winding to induce a high voltage in its secondary winding.

The error detecting section 5 includes a high voltage detecting circuit 5a comprising resistors R11, R12 for detecting and feeding back the high voltage generated from the FBT, and an error amplifier 5b for comparing the voltage detected by the resistors R11, R12 with the reference voltage Vref to supply the resultant voltage as an error detection voltage to the non-inverting input terminal of the comparator 8.

Here, R1 to R10 refer to resistors; ZD1 to ZD3 refer to Zener diodes; D1 to D5 refer to diodes; C1 to C7 refer to capacitors; and Q1, Q3, Q4 refer to transistors.

Operation of an FBT drivign apparatus for video display appliances can be described in detail with reference to FIGS. 2, 3A to 3F and 4A to 4F.

FIGS. 3A to 3F illustrate the waveforms at various points of FIG. 2 when the horizontal sync control signal P goes 'high' due to the input of low horizontal frequency. If a horizontal sync signal fh of low frquency, for example, of below 60 KHz as shown in FIG. 3A is inputted, the horizontal sync control signal P goes 'high', and thus the NAND gate G1 of the horizontal frequency selecting section 2 is turned off by the NAND gate G2, causing the divided horizontal frequency outputted from the J-K-type flip-flop 6 as shown in FIG. 3B to be cut off by the NAND gate G2.

At this stage, the horizontal sync signal fh as shown in FIG. 3A which has not been divided by the NAND gates G3, G4 is supplied to the differentiation circuit 7.

The horizontal sync signal fh inputted to the differentiation circuit 7 is differentiated into the waveform as shown in FIG. 3D ('d' point in FIG. 2) and then supplied to the inverting input terminal of the comparator 8 via transistor Q2. The comparator 8 compares the waveform at point 'd' supplied to its inverting input terminal with the waveform at point 'e' in FIG. 3D which is supplied from the error amplifier 5b to its non-inverting input terminal to output a resultant circular wave pulse signal as illustrated in FIG. 3E. The circular wave pulse signal drives the field effect transistor FET1 of the high voltage generating section 4.

If the field effect transistor FET1 is driven by the circular wave pulse signal, a driving power supply is provided to the primary winding of the FBT, and thus a high voltage is induced in the secondary winding of the FBT. The output high voltage from the secondary winding of the FBT is then supplied to the following circuits requiring the high voltage.

The output high voltage from the FBT is detected by the high voltage detecting circuit 5a comprising resistors R11, R12, and then supplied to the inverting input terminal of the error amplifier 5b. The error amplifier 5b then compares the detected voltage with the reference voltage Vref to supply the resultant voltage to the comparator 8 as an error detection voltage.

As described above, the comparator 8 compares the error detection voltage supplied from the error amplifier 5b with the signal voltage provided from the differentiation circuit 7, and supply the resultant circular wave pulse signal to the field effect transistor FET1 to drive the field effect transistor FET1.

The driving power supply provided to the primary winding of the FBT by the field effect transistor FET1 is evenly maintained irrespective of the horizontal frequency changes to escalate the high voltage driving efficiency of the FBT. The following is the detailed description of the operation of the FBT.

As mentioned above, the comparator 8 compares the error detection voltage with the signal voltage provided from the differentiation circuit 7 as shown in FIG. 3D. In other words, the comparator 8 senses the voltage difference between the two points 'e' and 'd' to change the duty of the resultant circular wave pulse signal according to the horizontal frequency as illustrated in FIG. 3E. The field effect transistor FET1 is thus driven by the circular wave pulse signal of duty changes. FIG. 3F illustrates the waveform appearing on the drain of the field effect transistor FET1 according to the duty cycle of the horizontal pulse signal. The driving power supply is provided to the primary winding of the FBT by the output of the field effect transistor FET1. The high voltage induced in the secondary winding of the FBT is amplified by the coils L2, L4, and then multistage-rectified by the diodes D3 to D5. The rectified voltage is smoothed by the capacitor C7, and then supplied to the following circuits requiring the high voltage.

FIGS. 4A to 4F illustrate the waveforms at various points of FIG. 2 when the horizontal sync control signal P goes 'low' by the input horizontal frequency of higher than 100 KHz.

If the input horizontal sync control signal P is 'low', the NAND gate G3 is turned off, while the NAND gate G1 is turned on. The divided horizontal sync signal fh outputted from the J-K-type flip-flop 6 as shown in FIG. 4B is supplied to the differentiation circuit 7 through the NAND gate G4. The output voltage of the differentiation circuit 7 is then applied to the comparator 8. The FBT is driven by the aforementioned process and generates the high voltage.

If the input horizontal frequency is 120 KHz, the output of the NAND gate G4 which receives the output of the J-K-type flip-flop 6 becomes 60 KHz, since the flip-flop 6 divides 120 Khz by a half. In other words, the driving frequency of the FBT becomes half the frequency of the input horizontal sync signal fh of high frequency.

As described above, an FBT driving apparatus according to the present invention employs a PWM-type circuit to maintain an even power supply provided to the primary winding of the FBT as well as to control the frequency for driving the FBT according to the input horizontal frequency level. Accordingly, a horizontal frequency of high frequency band does not result in deterioration of the FBT efficiency or heat loss. The FBT driving apparatus according to the present invention also enables construction of a circuit with a low priced general FBT.

What is claimed is:

1. A flyback transformer driving apparatus for a video display appliance comprising:

horizontal frequency dividing means for dividing a horizontal frequency in a predetermined ratio in response to an input horizontal sync signal;

horizontal frequency selecting means for selecting and supplying either the horizontal frequency or the divided horizontal frequency provided from the horizontal frequency dividing means in response to the horizontal sync signal;

PWM modulating means for PWM-modulating the horizontal frequency selected by and supplied from the horizontal frequency selecting means, and comparing the modulated horizontal frequency with an error detection voltage value to provide a resultant circular wave pulse signal;

high voltage generating means for being driven by the circular wave pulse signal supplied from the PWM-modulating means to generate a high voltage; and error detecting means for detecting the high voltage supplied from the high voltage generating means, and comparing the detected voltage with a reference voltage to output the resultant voltage as an error detection voltage.

2. An apparatus for driving a flyback transformer in a video display appliance according to claim 1, wherein the horizontal frequency dividing means comprises a J-K-type flip-flop for dividing the horizontal frequency by a half in response to the horizontal sync signal.

3. An apparatus for driving a flyback transformer in a video display appliance according to claim 1, wherein the horizontal frequency selecting means comprises a plurality of NAND gates for selecting either the horizontal frequency or the divided horizontal frequency provided from the horizontal frequency dividing means.

4. An apparatus for driving a flyback transformer in a video display appliance according to claim 1, wherein the PWM-modulating means comprises:

a differentiation circuit for differentiating the output signal from the horizontal frequency selecting means;

transistors switched by the output signal from the differentiation circuit; and a comparator for comparing the output signal from the transistors with the error detection voltage provided from the error detecting means to output the resultant circular wave pulse signal.

5. An apparatus for driving a flyback transformer in a video display appliance according to claim 1, wherein the high voltage generating means comprises:

a field effect transistor driven by the output circular wave pulse signal provided from the PWM-modulating means; and a flyback transformer for receiving a driving power supply at its primary winding from the field effect transistor and inducing the high voltage in its secondary winding.

6. An apparatus for driving a flyback transformer in a video display appliance according to claim 1, wherein the error detecting means comprises:

a high voltage detecting circuit for detecting the high voltage outputted from the high voltage generating means; and an error amplifier for comparing the voltage detected by the high voltage detecting circuit with a reference voltage to output the resultant voltage as an error detection voltage.

\* \* \* \* \*